US010359763B2

(12) United States Patent
Cama et al.

(10) Patent No.: US 10,359,763 B2
(45) Date of Patent: Jul. 23, 2019

(54) AUTOMATED PROTOTYPE CREATION BASED ON ANALYTICS AND 3D PRINTING

(71) Applicant: International Business Machines Corporation, Armonk, NY (US)

(72) Inventors: Karl J. Cama, Coppell, TX (US); Norbert Herman, Denver, CO (US); Shubhadip Ray, Somerset, NJ (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 664 days.

(21) Appl. No.: 14/886,433

(22) Filed: Oct. 19, 2015

(65) Prior Publication Data

US 2017/0106598 A1 Apr. 20, 2017

(51) Int. Cl.
*B29C 67/00* (2017.01)
*G05B 19/4099* (2006.01)
(Continued)

(52) U.S. Cl.
CPC ........ *G05B 19/4099* (2013.01); *B29C 64/386* (2017.08); *B33Y 50/02* (2014.12);
(Continued)

(58) Field of Classification Search
CPC ............ B29C 67/0088; G05B 19/4099; G05B 2219/35134; G05B 2219/49007; B33Y 50/02
See application file for complete search history.

(56) References Cited

U.S. PATENT DOCUMENTS

2009/0319068 A1* 12/2009 Sager ................. A61C 13/0022
700/98
2010/0174395 A1* 7/2010 Gu .......................... G05B 17/02
700/110
(Continued)

FOREIGN PATENT DOCUMENTS

WO       0126023 A2    4/2001
WO   2007114895 A2    4/2006
WO   2014201909 A2   12/2014

OTHER PUBLICATIONS

Abdel-Malek, K. and Maropis, N., "Design-to-Manufacture Case Study: Automatic Design of Post-Fabrication Mechanisms for Tubular Components," SME Journal of Manufacturing Systems, vol. 17, No. 3, pp. 183-195 (1998).*

(Continued)

*Primary Examiner* — Peter Bradford
(74) *Attorney, Agent, or Firm* — Garg Law Firm, PLLC; Rakesh Garg; Christopher K. McLane (57) ABSTRACT

Using an analytical model, a problem related to a product is identified from a collection of report data, the product being a three dimensional (3D) solid having a shape and produced from a manufacturing process. The problem is correlated with a set of factors. The set of factors describes a circumstance in which a user performs an operation of the product. According to a weight assigned to the problem, the problem is selected for prototyping. Using a processor and a memory, the set of factors and the operation are simulated by using a modified design of the product. In response to the modified design solving the problem, a specification of the modified design is provided for 3D printing to the user.

16 Claims, 5 Drawing Sheets

(51) Int. Cl.
*B33Y 50/02* (2015.01)
*B29C 64/386* (2017.01)

(52) U.S. Cl.
CPC ............. *G05B 2219/35134* (2013.01); *G05B 2219/49007* (2013.01); *Y02P 90/265* (2015.11)

(56) References Cited

U.S. PATENT DOCUMENTS

| | | | |
|---|---|---|---|
| 2010/0305995 A1* | 12/2010 | Boulila | G06F 8/10 705/7.23 |
| 2010/0312370 A1* | 12/2010 | Lind | E21B 41/00 700/98 |
| 2011/0013211 A1 | 1/2011 | Grosz et al. | |
| 2013/0108726 A1 | 5/2013 | Uckelmann et al. | |
| 2014/0182170 A1* | 7/2014 | Wawrousek | A43B 7/14 36/103 |
| 2015/0055086 A1 | 2/2015 | Fonte et al. | |
| 2015/0066189 A1 | 3/2015 | Mulligan et al. | |
| 2016/0167308 A1* | 6/2016 | Glasgow | B29C 67/0088 700/98 |
| 2016/0283893 A1* | 9/2016 | Dhiman | G06F 8/20 |

OTHER PUBLICATIONS

Abdel-Malek et al, Automated Design and Parametrization of Mechanical Part Geometry, Research in Engineering Design 11:206-217 (1999).*

Strano, M., Automatic tooling design for rotary draw bending of tubes, Int J Adv Manuf Technol 26: 733-740, (2005).*

Berman; 3-D printing: The new industrial revolution., Business horizons55, No. 2 (2011): 155-162.

* cited by examiner

AUTOMATED PROTOTYPE CREATION BASED ON ANALYTICS AND 3D PRINTING

TECHNICAL FIELD

The present invention relates generally to a method, system, and computer program product for prototyping three dimensional products. More particularly, the present invention relates to a method, system, and computer program product for automated prototype creation based on analytics and three dimensional printing.

BACKGROUND

Within the scope of the illustrative embodiments, a product is a three-dimensional (3D) physical object, which is designed and manufactured as a solid having a shape. A variety of manufacturing processes, including but not limited to 3D printing can produce a product or prototype. A product can include other products as parts or components.

A user of a product can use the product under a variety of circumstances and in a variety of manners. For example, consider a vacuum cleaner as an example product, which includes wheels as parts. A wheel is a product as well, which is included in a wheel assembly, which is also a product.

A user can use the vacuum cleaner on carpets, hardwood floors, linoleum, or on bare concrete floor. Some users may also use the vacuum cleaner in wet areas or areas with debris. In such circumstances of the use, the vacuum cleaner may be rolled onto high pile carpets, pet hair, grass and twigs, and the like. The wheels may come in contact with wool, nylon, cotton, vinyl, and other types of materials.

As a result, it is not uncommon to see a variety of fibers tangled in the wheel assembly of a vacuum cleaner. Some vacuum cleaners may experience a failure of the wheel assembly as a result of such entanglement or obstruction of the movement of the wheel.

Some circumstances of a use of a product may be anticipated by the manufacturer, for which the product may be tested before the product is supplied to the users. Other circumstances of use of the product may not be anticipated or tested. For example, some circumstances of the use of the product may surface only upon actual use by actual users in actual circumstances.

Users report their experiences with a product in a variety of ways. Some users request warranty repairs, others submit service requests, and some share their experiences with the manufacturer or other users on social media, and in reviews, surveys, complaints, product return forms etc. Other users, such as product testers and analysts also report their findings in a variety of ways. The reported data from the various users can take the form of text, audio, video, images, or some combination thereof.

SUMMARY

The illustrative embodiments provide a method, system, and computer program product for automated prototype creation based on analytics and 3D printing. An embodiment includes a method. The embodiment identifies, using an analytical model, from a collection of report data a problem related to a product, the product being a three dimensional (3D) solid having a shape and produced from a manufacturing process. The embodiment correlates the problem with a set of factors, where the set of factors describe a circumstance in which a user performs an operation of the product. The embodiment selects, according to a weight assigned to the problem, the problem for prototyping. The embodiment simulates, using a processor and a memory, the set of factors and the operation by using a modified design of the product. The embodiment provides for 3D printing, responsive to the modified design solving the problem, a specification of the modified design to the user.

Another embodiment includes a computer program product comprising one or more computer-readable storage devices, and program instructions stored on at least one of the one or more storage devices.

Another embodiment includes a computer system comprising one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

The illustrative embodiments recognize that presently, a manufacturer of a product relies upon a design process to address reports or concerns from the users, which is not based on automated prototype creation with analytics. For example, a call center person takes a call from a user and notes the user's concerns. A technical support person determines whether the user's concerns can be addressed by replacement of the product or a part thereof, and if so, the replacement product or part is supplied to the user.

Occasionally, some of the complaints or concerns give rise to a need for redesigning or reconfiguring the product or a part thereof. Presently, the manufacturer determines which part or product, if any, will be redesigned in some way. The manufacturer performs product testing at the manufacturing facility using the manufacturer's quality control personnel and procedures. Upon the product meeting the redesign specifications and meeting the quality metrics of the manufacturer, the manufacturer releases the redesigned product to a user.

The illustrative embodiments recognize that products are becoming increasingly sophisticated. Products today involve complex designs and materials. In order to compress the time in getting a product to market, many products are not adequately field tested for durability, usability, ergonomics, or suitability for a circumstance of use. Often, manufacturers cannot respond to users' feedback of customer satisfaction with a product until the next planned design cycle of the product.

Furthermore, the illustrative embodiments recognize that presently, the ability to customize and deliver a product prototype to a user for design validation and other reasons has only been limited to digital visualization on computer screens. The illustrative embodiments recognize that 3D prototyping can be used to determine the reliability, the usability, the customer acceptance, and other factors associated with a product. The illustrative embodiments further recognize that 3D prototyping can allow manufacturers to significantly reduce time and cost in delivering desirable products to the users.

The illustrative embodiments used to describe the invention generally address and solve the above-described problems and other problems related to addressing user concerns with rapid 3D prototyping and evaluation. The illustrative embodiments provide a method, system, and computer program product for automated prototype creation based on analytics and 3D printing.

An embodiment can be implemented as a software application. The application implementing an embodiment can be configured as a modification in an existing manufacturing system, as a separate application that operates in conjunction with an existing manufacturing system, as a standalone system, or some combination thereof.

An embodiment collects product related data reported by various users of the product from a variety of data sources. For example, the embodiment collects repair records of a product, warranty claims related to the product, customer support questions or call data, customer complaints to various business and regulatory agencies, product return or replacement questionnaires, social media posts and interactions about the product, industry reviews of the product, surveys, retailer reviews of the product, and many other types of data—collectively referred to herein as report data. As can be seen, the report data can come from a variety of data sources. The embodiment collects the report data in the form of structured or unstructured textual, audio, video, image data, or some combination thereof, from the variety of data sources.

The embodiment analyzes the report data. For example, the embodiment analyzes the report data in video form using video analysis with video analytics, the report data in image form using image analysis with image analytics, or the report data in audio form using audio analysis, to result in textual and numeric data. The embodiment analyzes the resultant textual and numeric data as well as the report data that is originally in text form, to isolate a set of issues related to the product.

For example, consider the vacuum cleaner as an example product. The report data may show that some users have had problems with the vacuum cleaner where the suction is lost. The report data may show that some other users have had problems with the vacuum cleaner where the brush fails to turn. The report data may also show that some users have had problems with the vacuum cleaner where the wheels become immovable.

The embodiment extracts such issues from the report data where the issue relates to the product or a part thereof. For example, the extraction may use a language library, a variety of analytical models, such as clustering and association rules, on the report data, and other known techniques for this purpose. Thus, the embodiment isolates a set of issues related to the product from a given set or collection of report data. An analytical engine according to an embodiment includes the capabilities to perform textual analysis—e.g. using Natural Language Processing (NLP), image analysis, audio analysis, video analysis, use analytical models, product-specific (domain-specific) dictionaries, language models or linguistic tools, or some combination thereof.

An embodiment correlates useful information from the report data with an identified issue. Again, consider the vacuum cleaner as an example product. A wheel assembly in the vacuum cleaner is another example product with which an issue is related, e.g., the wheels become immovable.

Now, suppose that in the report data is one user's post on social media that the static electricity builds up in the vacuum cleaner when vacuuming nylon carpets. Another user posts a picture of carpet fibers entangled in a wheel of the vacuum cleaner. Another user posts a video of the vacuum cleaner in operation over nylon carpet. Another user posts a video of the vacuum cleaner in operation over a woolen rug.

An embodiment uses a set of association rules to associate and correlate useful information from the report data with an identified issue. For example, if a trouble call log shows that a user had the wheels of the vacuum cleaner become bound by entangled fibers, an example rule may specify that information where fibers are interacting with a wheel of the vacuum cleaner should be extracted from the report data. Accordingly, an analytical engine determines from the various users' example posts that the nylon fibers appear to extend from the carpet due to static electricity but not the wool fibers. The analytical engine further determines that deep pile nylon carpets can have nylon strands that are long enough to reach an exposed gear in the wheel assembly and interfere with the gears.

Generally, in this example, an embodiment ingests and analyzes data, whether in structured form or unstructured data from complaints, reviews etc. from multiple data streams from multiple data sources. The analysis determines whether there are correlations between any carpet types, geographic locations, weather, moisture, etc., or other contributing factors and production issues considering manufacturing batches, locations and components.

The analytical model thus correlates nylon carpet, deep pile carpet, gear in the wheel assembly, and static electricity as factors correlated with the issue of the wheels becoming immovable. An issue for which one or more correlated factors have been extracted from the report data and associated with the issue is referred to herein as a correlated issue. Operating in this manner, the analytical engine produces a set of correlated issues.

An embodiment clusters and scores the correlated issues. The embodiment clusters and segments the correlated issues to generate the highest instances of complaints and contributing factors. In one embodiment, the score is also based on a cost benefit analysis, resulting in a list of requested features in the order of their return on investment (ROI).

For example, an issue may be scored or weighted based on rules related to a use circumstance, a manufacturer requirement, a severity of an issue, a volume of report data related to the issue, or some combination of rules based on these and other considerations. Generally, the weighting rules can be categorized into (i) policy based weighting, e.g., including but not limited to manufacturer requirements, vision, competitiveness, return on investment, cost benefit analysis; (ii) report factor based weighting, e.g., including but not limited to a volume or severity of report data corresponding to an issue; and (iii) product factor based weighting policies, e.g., including but not limited to a use circumstance based weighting.

As some non-limiting examples, a rule according to a use circumstance may be that issues related to vacuuming carpets have to be at a higher weight than wet area vacuuming related issues. Another example rule may be that an issue whose solution presents a greater than a threshold ROI receives a higher than a threshold weight. Another example rule may be that an issue which can be resolved without a new product release (an example of a manufacturer requirement), receive at least a certain weight. Another example rule may allocate a weight that is proportional to a severity of an issue or a volume of report data related to the issue.

These examples of circumstances, correlated factors, issues, and the correlation rules are not intended to be limiting. From this disclosure, those of ordinary skill in the art will be able to conceive many other variations of these aspects, and the same are contemplated within the scope of the illustrative embodiments.

An embodiment computes a weight—or score—of a correlated issue using a mathematical expression suitable to combine the weighting criteria from one or more weighting rules. The embodiment produces a set of scored correlated issues, or simply scored issues.

An embodiment may set a threshold score for addressing an issue. For example, if a score of a scored issue exceeds a threshold score, the embodiment selects the scored issue for addressing using 3D prototyping.

An embodiment simulates a selected scored issue. For example, a simulation system can be configured to simulate the correlated factors of the issue, examine a performance of a product in that simulation, and produce an outcome. The simulation system can be further configured to make modifications to the product within specified design constraints to test the modified product within the simulation.

Through such a simulation, an embodiment determines a modified form of the product associated with the issue. The modified form of the product addresses the issues by alleviating the issue when the correlated factors are present.

Consider the vacuum cleaner example again. After analysis of the incident records, an embodiment implements the simulation process by automatically generating a 3D model of the wheel assembly. The embodiment then utilizes virtual reality based simulation to study the effects of different carpet types, density, and pile thickness on the wheel assembly. The embodiment performs a detailed analysis of how the real wheels perform given such factors, e.g., to examine the wheels from multiple angles, and determine the effect of different materials for the construction of the wheels.

The embodiment uses this example 3D analysis and virtual reality environment to determine that the current wheel design and placement of drive gears contributes to the problem of the wheels binding with carpet fiber. The embodiment determines that static electric charge attracts loose carpet fibers to the wheels and after a period of use under those circumstances, there is sufficient build up of carpet fibers in the wheel assembly causing a gear in the wheel assembly to bind and prevent the drive motor from propelling the vacuum cleaner. A working prototype validates that indeed the computer simulation had pinpointed the problem.

An embodiment creates a specification of the modified product. The specification is usable to print a 3D prototype of the modified product using 3D printing technology. The embodiment uploads the specification to a server data processing system, such as in a cloud platform. One or more users can download the specification from the server and print the 3D prototype.

An embodiment further uses a feedback mechanism to allow consumers to describe their experience with the newly designed part. For example, in one embodiment, the 3D template or specification is made available on the cloud and offered for download by consumers who have logged a complaint. The consumers are able to print a new part at their convenience and quickly and efficiently replace the defective part. The consumer also has the option to personalize the part to their liking.

The users use the 3D prototype and observe the performance of the modified product, which has been prototyped. The users supply their feedback on the acceptability of the 3D prototype. In one embodiment a new design template for the modification is auto generated based on logic, rules and intelligence applicable in the production of the product, such as changing the placement of the drive gears so as to not expose the teeth of the gears avoiding carpet fiber buildup. The 3D simulation validates that the modifications and re-design resolved the issue being addressed.

In some cases, a 3D prototype may be targeted to a single user or a small group of users, e.g., of less than a threshold number of users. In such customized prototyping scenario, the users who test the prototype can input their feedback directly into the simulation state to alter the design or another aspect of the simulation as described herein. Such a feedback loop is useful in rapid fitment for prototyped product modifications to special conditions.

In other cases, a 3D prototype may be targeted to larger than a threshold number of users. In such general prototyping scenario, the users who test the prototype can input their feedback in the form of additional report data. An embodiment collects and processes the additional report data just as an embodiment processes the report data, as described herein. Such a feedback loop is useful in interactive and responsive addressing of widespread issues.

A method of an embodiment described herein, when implemented to execute on a device or data processing system, comprises substantial advancement of the functionality of that device or data processing system in rapid and verified resolution of product related issues through 3D prototyping. For example, a prior-art method of resolving issues with a product either replace a problematic product with a working instance of the same product, or wait to resolve the problem in a new model of the product according to a product cycle. An embodiment addresses an issue with a product by correlating the issue with a set of factors that affect the issue with analytics, and prototyping a solution for the issue. An embodiment further allows a user to create a 3D printed prototype to determine whether the prototype addresses the issue to the user's satisfaction. An embodiment provides the ability for retailers or manufacturers to offer consumers a personalized and customized version of a 3D product to meet the needs of a specific demographic, safety feature or to meet governmental or local codes. An embodiment is able to scale the creation and distribution of 3D product prototypes for consumer groups of any size, yet providing each consumer the ability to add a personal touch and customize the 3D prototype to their liking. An embodiment further provides an ability to validate a 3D prototype design by providing consumers the direct ability to touch and feel the 3D printed prototyped solution and provide their feedback, which can be incorporated into design revisions. This manner of automated prototype creation based on analytics and 3D printing is unavailable in the prior-art.

Thus, a substantial advancement of such devices or data processing systems by executing a method of an embodiment is in a faster, more interactive, and verified resolution of issues with products as compared to the prior-art.

The illustrative embodiments are described with respect to certain source report data, data sources, analytics, products, issues, rules, weights, categories, thresholds, simulations, dissemination systems, feedbacks, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 1:
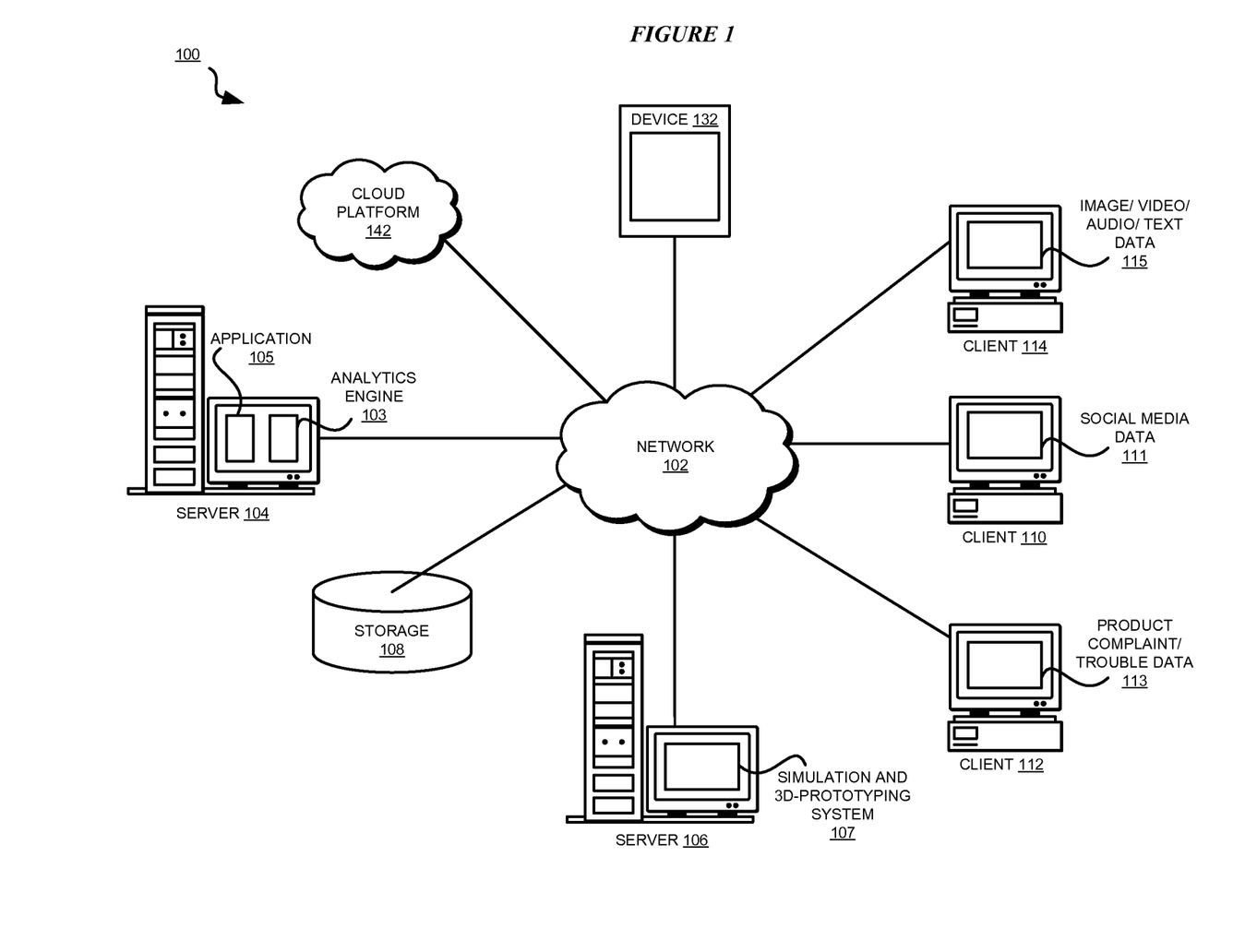
FIG. 1 depicts a block diagram of a network of data processing systems in which illustrative embodiments may be implemented.
Figure 2:
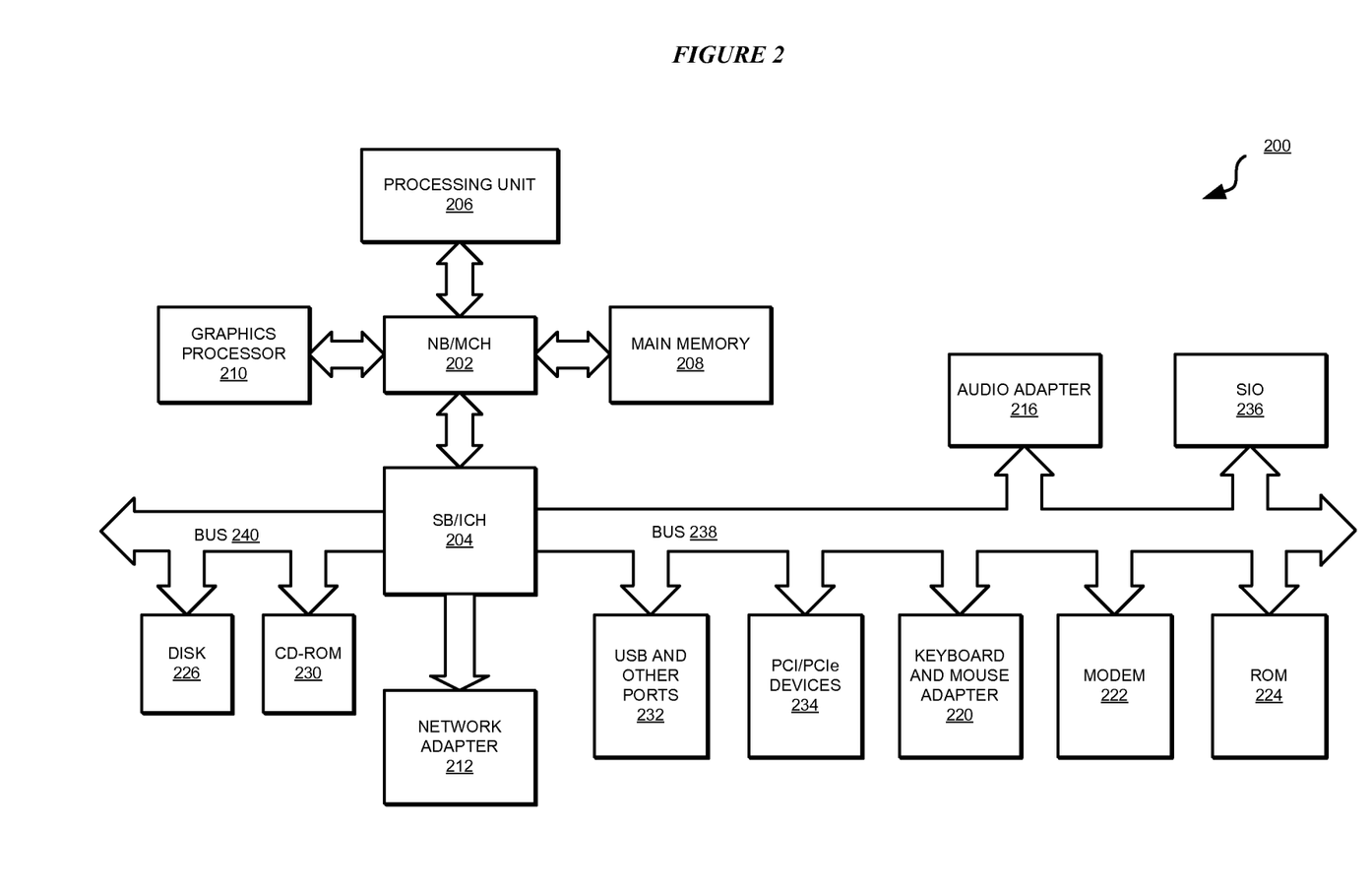
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105 implements an embodiment described herein. Analytics engine 103 is constructed in any suitable manner to perform the analytic functions described herein. Data 111 comprises report data obtained from social media. Data 113 comprises product related report data about complaints, troubles, warranty and other similar problems with the product or a part thereof. Data 115 is report data obtained in any other suitable manner. Data 111, 113, and 115 can each take the form of image, text, audio, video, or a combination thereof as described herein. Simulation and 3D-prototyping system 107 is a system capable of simulating a set of correlated factors of an issue with a product, and test a designed or re-designed prototype of the product under those factors. System 107 outputs a result of the simulation, acceptability of the tested product, and a specification of the accepted product. The specification produced from system 107 is uploaded to cloud platform 142.

Servers 104 and 106, storage unit 108, and clients 110, 112, and 114 may couple to network 102 using wired connections, wireless communication protocols, or other suitable data connectivity. Clients 110, 112, and 114 may be, for example, personal computers, network computers, or mobile devices.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), Linux® (Linux is a trademark of Linus Torvalds in the United States and other countries), iOS™ (iOS is a trademark of Cisco Systems, Inc. licensed to Apple Inc. in the United States and in other countries), or Android™ (Android is a trademark of Google Inc., in the United States and in other countries). An object oriented programming system, such as the Java™ programming system, may run in conjunction with the operating system and provide calls to the operating system from Java™ programs or applications executing on data processing system 200 (Java and all Java-based trademarks and logos are trademarks or registered trademarks of Oracle Corporation and/or its affiliates).

Instructions for the operating system, the object-oriented programming system, and applications or programs, such as application 105 in FIG. 1, are located on storage devices, such as hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Figure 3:
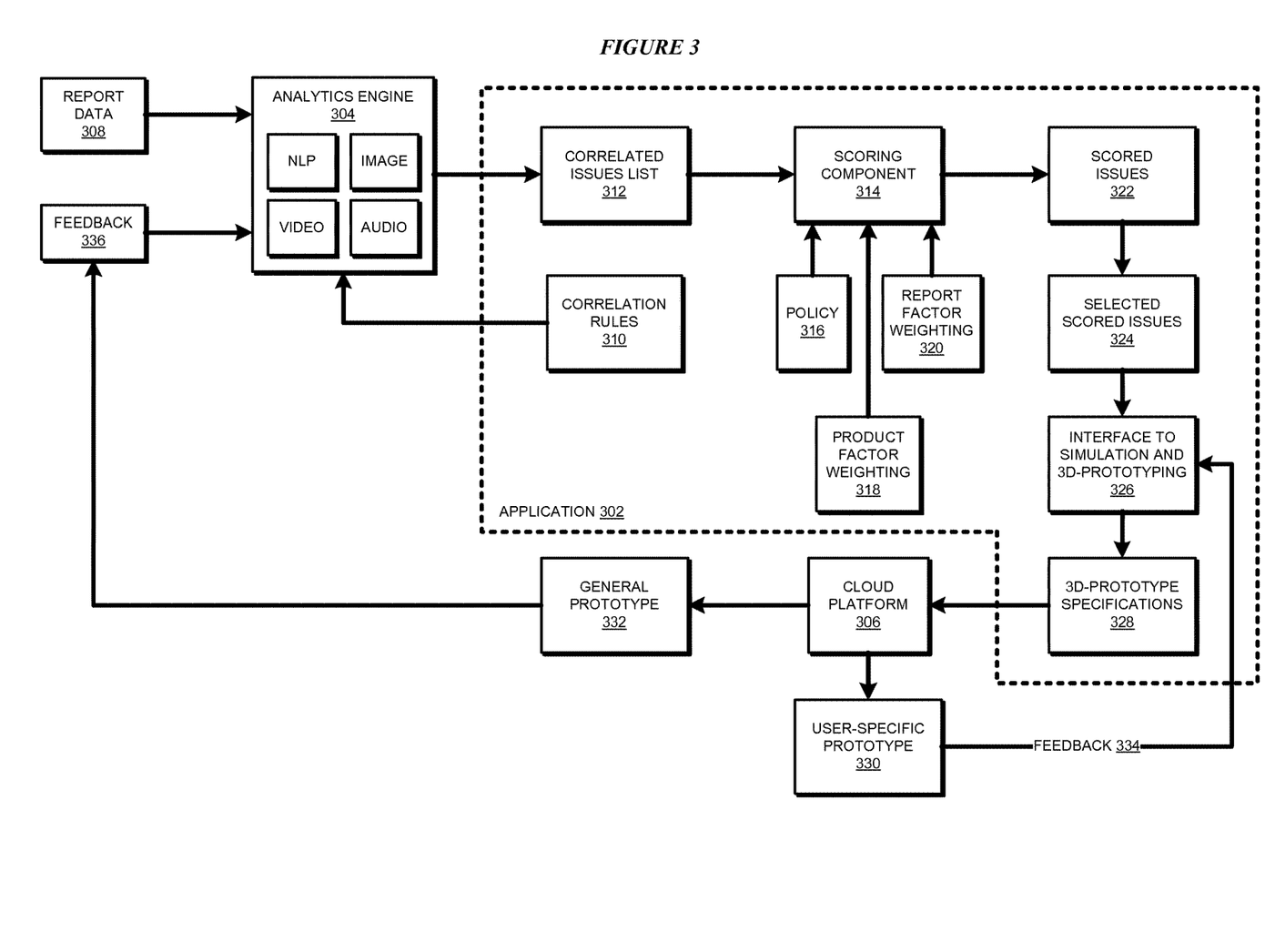
FIG. 3 depicts a block diagram of an example configuration for automated prototype creation based on analytics and 3D printing in accordance with an illustrative embodiment

With reference to FIG. 3, this figure depicts a block diagram of an example configuration for automated prototype creation based on analytics and 3D printing in accordance with an illustrative embodiment. Application 302 is an example of application 105 in FIG. 1. Analytics engine 304 is an example of analytics engine 103 in FIG. 1. For example, analytics engine 304 includes, or has access to NLP, image, audio, and/or video data analysis capabilities as described herein. Cloud platform 306 is an example of cloud platform 142.

Report data 308 includes any combination of data 111, 113, and 115 of FIG. 1. Analytics engine 304 accepts report data 308 and correlation rules 310 to produce correlated issues 312. Scoring component 314 scores correlated issues 312 according to one or more weighting rules from policies based weighting rules 316, product factors based weighting rules 318, or report factors based weighting rules 320. Upon such scoring, scoring component 314 produces scored issues 322.

Selected scored issues 324 is a subset of scored issues 322. For example, application 302 selects those scored issues 322 as selected scored issues 324 whose scores or weights exceed a threshold score or weight.

To resolve an issue from selected scored issue 324, interface 326 calls, invokes, or otherwise activates a simulation and 3D prototyping system, such as system 107 in FIG. 1. Particularly, interface 326 invokes the system to simulate the factors correlated with the issue to be resolved, simulate the product involved in the issue, simulate an operation of the product relative to those factors, and determine an outcome of the operation. In one embodiment, the simulating of the product is performed by constructing a 3D prototype of the product and subjecting the prototype to the simulation.

Interface 326 further enables the simulation and 3D prototyping system to modify a design of the product to mitigate or alleviate the issue that is being resolved. Interface 326 causes the system to simulate the operation of the modified product to re-determine the outcome.

By iteratively modifying the product and determining the outcomes, interface 326 allows the system to arrive at a modified design of the product whose operation produces a desirable outcome under the correlated factors. When a desirable outcome has been reached with a modified product in the simulation, interface 326 obtains from simulation and 3D prototyping system specifications 328 for the 3D prototype of the modified product. Application 302 uploads specification 328 to cloud platform 306, or another server—not necessarily in a cloud data processing environment—for distribution to the users of the product.

The users of the product include but are not limited to the users who contributed data to report data 308. Furthermore, uploaded specification 328 may be distributed differently for different users. For example, if the modified product of specification 328 is user-specific prototype 330, targeted to below a threshold number of users or a specific user or group, only those users for whom the 3D prototype has been created may download specification 328. For example, if the modified product of specification 328 is general prototype 332, targeted to a group of above a threshold number of users or generally to any user of the product, such users may download specification 328.

When a user or group downloads specification 328 for user-specific prototype 330, such users provide feedback 334. Feedback 334 serves as a user input to the simulation and 3D prototyping system via interface 326. Feedback 334 can alter the simulation by altering a correlation factor, a design of the product, an operation to be performed, an outcome to be accepted, or some combination of these and other considerations in the simulation. In other words, feedback 334 makes the simulation and prototyping an interactive exercise with such users.

When a user or group downloads specification 328 for general prototype 332, such users provide feedback 336. Feedback 336 serves as additional report data. Users may provide feedback 336 in any manner and using any data source that may be configured for use with application 302. When feedback 336 is available, analytics engine 304 considers feedback 336 with ongoing collection of report data 308, and analyzes feedback 336 in a manner similar to the analysis of report data 308.

Figure 4:
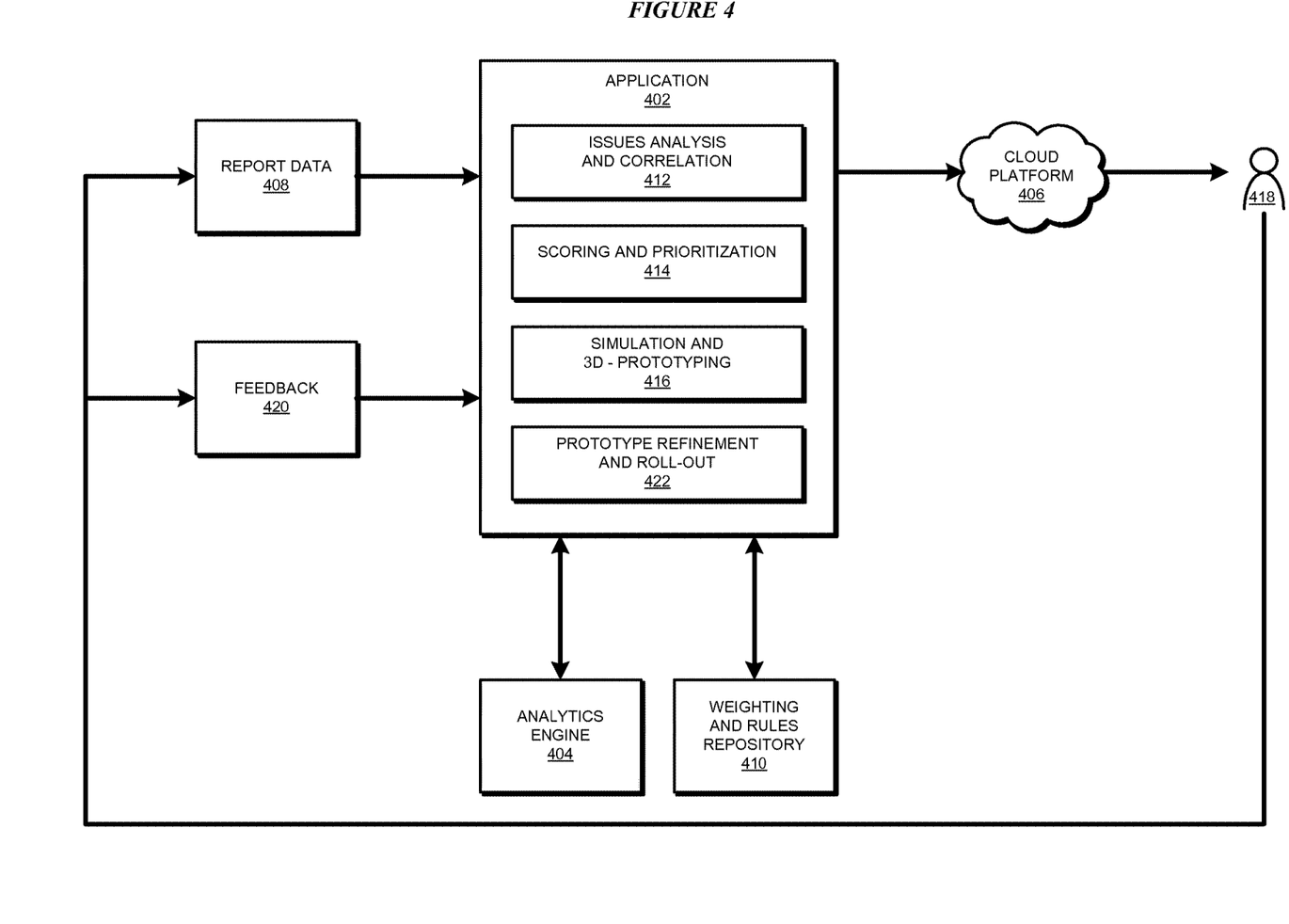
FIG. 4 depicts a block diagram of example components for automated prototype creation based on analytics and 3D printing in accordance with an illustrative embodiment.

With reference to FIG. 4, this figure depicts a block diagram of example components for automated prototype creation based on analytics and 3D printing in accordance with an illustrative embodiment. Application 402 is an example of application 302 in FIG. 3. Analytics engine 404 is an example of analytics engine 304 in FIG. 3. Cloud platform 406 is an example of cloud platform 306 in FIG. 3. Report data 408 is an example of report data 308 in FIG. 2. Repository 410 includes a combination of rules for correlation and rules for weighting.

Component 412 analyzes report data 408 using analytics engine 404 and correlation rules from repository 410. Component 412 identifies product-related issues from report data 408 and constructs correlated issues, such as correlated issues 312 in FIG. 3.

Component 414 scores the correlated issues using weighting rules from repository 410. Component 414 produces scored issues 322 in FIG. 3. Component 414 further prioritizes according to a threshold weight, or otherwise selects some selected scored issues 324 for addressing through simulation and 3D prototyping.

Component 416 implements interface 326 in FIG. 3. Component 416 simulates and prototypes, or causes the simulation and prototyping to occur, as described with respect to interface 326 in FIG. 3. Component 416 produces specification 328 and uploads to cloud platform 406.

Users 418 download the specification from cloud platform 406 and 3D print a 3D product prototype according to the specification. Users 418 use the 3D printed product prototype and provide feedback 420. In some cases, feedback 420 becomes a part of report data 408, which component 412 processes. In other cases, feedback 420 becomes an input to component 416 to control the simulation and prototyping.

Component 422 refines or modifies a prototype according to feedback 420. Once feedback 420 indicates acceptance, or at least acceptance by a threshold number of users up to a threshold level of acceptance, component 422 rolls out the prototype as a modified product as a solution to a reported issue.

Figure 5:
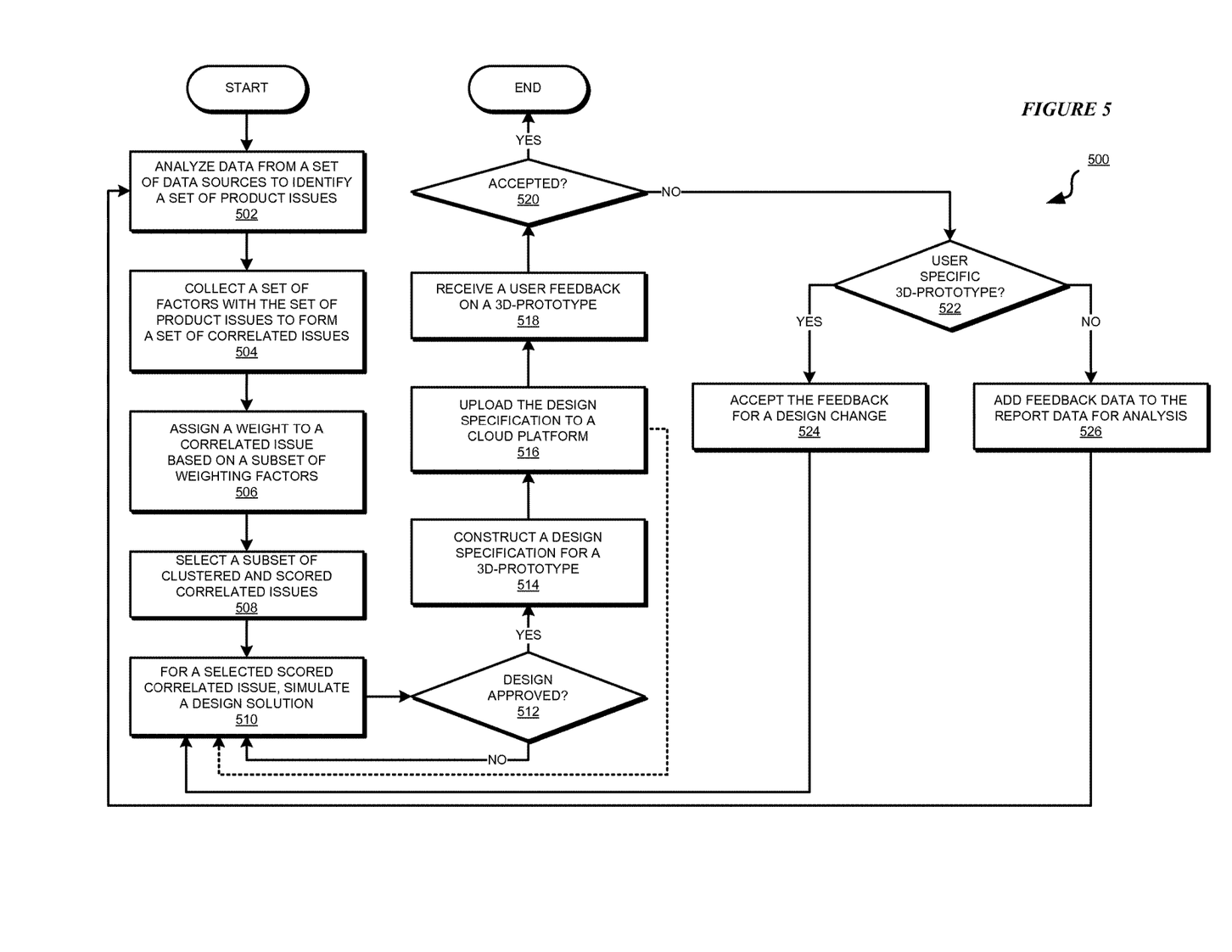
FIG. 5 depicts a flowchart of an example process for automated prototype creation based on analytics and 3D printing in accordance with an illustrative embodiment.

With reference to FIG. 5, this figure depicts a flowchart of an example process for automated prototype creation based on analytics and 3D printing in accordance with an illustrative embodiment. Process 500 can be implemented in application 402 in FIG. 4.

The application analyzes report data—from a set of data sources to identify a set of product related issues (block 502). The application correlates a set of factors with an issue in the set of issues to form a correlated issue. The application produces a set of correlated issues in this manner (block 504).

The application assigns a weight to a correlated issue based on a subset of a set of weighting rules to produce scored correlated issues (block 506). The application selects a subset of the scored correlated issues (block 508).

For a selected correlated scored issue, the application simulates a design solution (block 510). The application determines whether the design meets an approval criterion (block 512). If the design does not meet the approval criterion ("No" path of block 512), the application returns process 500 to block 510 and attempts another simulation with a different design solution.

If the design meets the approval criterion ("Yes" path of block 512), the application constructs a design specification for a 3D prototype (block 514). The application uploads the design specification for users to download and print using 3D printing technology (block 516). The application repeats blocks 510-516 for simulating and prototyping design solutions for any number of selected correlated issues in this manner.

The application receives a feedback from a user who downloads the specification, prints a 3D prototype, and uses the 3D prototype (block 518). The application determines whether the user feedback indicates acceptance of the designed prototype as a solution to the corresponding issue (block 520). If the prototype is accepted ("Yes" path of block 520), the application ends process 500 thereafter.

If the prototype is not accepted ("No" path of block 520), the application determines whether the prototype is a user-specific prototype (block 522). If the prototype is a user-specific prototype ("Yes" path of block 522), the application accepts the feedback as an input for a design change (block 524). Thereafter, the application returns process 500 to block 510 to simulate the changed design according to the feedback.

If the prototype is not user-specific ("No" path of block 522), the application accepts the feedback as additional report data (block 526). Thereafter, the application returns process 500 to block 502 to analyze the feedback with other report data.

Thus, a computer implemented method, system or apparatus, and computer program product are provided in the illustrative embodiments for automated prototype creation based on analytics and 3D printing. Where an embodiment or a portion thereof is described with respect to a type of device, the computer implemented method, system or apparatus, the computer program product, or a portion thereof, are adapted or configured for use with a suitable and comparable manifestation of that type of device.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
   manufacturing a three-dimensional (3D) solid product to operate in a plurality of environments;
   collecting, from the plurality of environments, report data about a performance of the product in the plurality of environments;
   identifying, using an analytical model, from the report data a problem related to an operation of the product in an environment from the plurality of environments;
   correlating the problem with a set of factors, wherein a factor in the set of factors corresponds to a characteristic of the environment in which the operation is performed;
   3D prototyping a modified design of the product, the modified design of the product being configured to solve the problem;
   simulating, in a simulation system using a processor and a memory, the factor and the operation related to the problem; and
   3D printing, responsive to the modified design solving the problem with the factor in the simulation system, a 3D prototype of the product according to the modified design.

2. The method of claim 1, further comprising:
   determining a user who reported the problem;
   allowing only the user to obtain a specification of the modified design, wherein the problem is a user-specific problem related only to the user, and wherein the modified design solves the user-specific problem;
   accepting from the user an input, the input causing a further modification of the modified design to produce a second specification; and
   providing the second specification to the user for 3D printing.

3. The method of claim 1, further comprising:
   allowing a group of users to obtain a specification of the modified design, wherein the problem is a general problem related to the group, and wherein the modified design solves the general problem;
   accepting an input from a user in the group, the input forming a feedback; and
   adding the feedback to the report data for the analyzing.

4. The method of claim 1, further comprising:
   assigning a weight to the problem according to weighting rule;
   selecting, according to the weight assigned to the problem, the problem for prototyping.

5. The method of claim 4, wherein the weighting rule is applicable to the report data.

6. The method of claim 4, wherein the weighting rule is applicable to the product.

7. The method of claim 1, wherein the correlating uses a correlation rule.

8. The method of claim 1, further comprising:
   analyzing textual data in the collection of report data using a Natural Language Processing (NLP) engine;
   analyzing image data in the collection of report data using image analysis engine; and
   extracting the set of factors from the textual data and the image data.

9. A computer program product comprising one or more computer-readable storage devices, and program instructions stored on at least one of the one or more storage devices, the stored program instructions comprising:
   program instructions to manufacture a three-dimensional (3) solid product to operate in a plurality of environments;
   program instructions to collect, from the plurality of environments, report data about a performance of the product in the plurality of environments;
   program instructions to identify, using an analytical model, from the report data a problem related to an operation of the product in an environment from the plurality of environments;
   program instructions to correlate the problem with a set of factors, wherein a factor in the set of factors corresponds to a characteristic of the environment in which the operation is performed;

program instructions to 3D prototype a modified design of the product, the modified design of the product being configured to solve the problem;

program instructions to simulate, in a simulation system using a processor and a memory, the factor and the operation related to the problem; and program instructions to 3D print, responsive to the modified design solving the problem with the factor in the simulation system, a 3D prototype of the product according to the modified design.

10. The computer program product of claim 9, the stored program instructions further comprising:

program instructions to determine a user who reported the problem;

program instructions to only the user to obtain a specification of the modified design, wherein the problem is a user-specific problem related only to the user, and wherein the modified design solves the user-specific problem;

program instructions to accept from the user an input, the input causing a further modification of the modified design to produce a second specification; and program instructions to provide the second specification to the user for 3D printing.

11. The computer program product of claim 9, the stored program instructions further comprising:

program instructions to allow a group of users to obtain a specification of the modified design, wherein the problem is a general problem related to the group, and wherein the modified design solves the general problem;

program instructions to accept an input from a user in the group, the input forming a feedback; and program instructions to add the feedback to the report data for the analyzing.

12. The computer program product of claim 9, the stored program instructions further comprising:

program instructions to assign a weight to the problem according to weighting rule;

program instructions to select, according to the weight assigned to the problem, the problem for prototyping.

13. The computer program product of claim 12, wherein the weighting rule is applicable to the report data.

14. The computer program product of claim 12, wherein the weighting rule is applicable to the product.

15. The computer program product of claim 9, wherein the correlating uses a correlation rule.

16. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:

program instructions to manufacture a three-dimensional (3) solid product to operate in a plurality of environments;

program instructions to collect, from the plurality of environments, report data about a performance of the product in the plurality of environments;

program instructions to identify, using an analytical model, from the report data a problem related to an operation of the product in an environment from the plurality of environments;

program instructions to correlate the problem with a set of factors, wherein a factor in the set of factors corresponds to a characteristic of the environment in which the operation is performed;

program instructions to 3D prototype a modified design of the product, the modified design of the product being configured to solve the problem;

program instructions to simulate, in a simulation system using a processor and a memory, the factor and the operation related to the problem; and program instructions to 3D print, responsive to the modified design solving the problem with the factor in the simulation system, a 3D prototype of the product according to the modified design.

* * * * *